United States Patent
Meade et al.

(10) Patent No.: US 12,541,584 B2
(45) Date of Patent: Feb. 3, 2026

(54) METHOD AND SYSTEM FOR COMMUNICATION SESSION MANAGEMENT WITH ENHANCED SECURITY

(71) Applicant: Christiana Care Health System, Inc., Wilmington, DE (US)

(72) Inventors: Jonathan Meade, Newark, DE (US); John DiGiovanni, Wilmington, DE (US); John Evans, Landenberg, PA (US); Erwin Bautista, Aston, PA (US)

(73) Assignee: CHRISTIANA CARE HEALTH SYSTEM, INC., Wilmington, DE (US)

( * ) Notice: Subject to any disclaimer, the term of this patent is extended or adjusted under 35 U.S.C. 154(b) by 456 days.

(21) Appl. No.: 18/087,146

(22) Filed: Dec. 22, 2022

(65) Prior Publication Data

US 2023/0205867 A1    Jun. 29, 2023

Related U.S. Application Data

(60) Provisional application No. 63/304,041, filed on Jan. 28, 2022, provisional application No. 63/293,311, filed on Dec. 23, 2021.

(51) Int. Cl.
*G06F 21/45* (2013.01)
*G06F 21/31* (2013.01)
*G06F 21/32* (2013.01)

(52) U.S. Cl.
CPC .............. *G06F 21/45* (2013.01); *G06F 21/31* (2013.01); *G06F 21/32* (2013.01); *G06F 2221/2139* (2013.01)

(58) Field of Classification Search
CPC ........ G06F 21/31; G06F 21/316; G06F 21/32; G06F 21/45; G06F 2221/2139; H04L 9/3226–3231; H04L 63/0861
See application file for complete search history.

(56) References Cited

U.S. PATENT DOCUMENTS

| | | | |
|---|---|---|---|
| 2006/0242424 A1* | 10/2006 | Kitchens | G06F 21/32 713/183 |
| 2017/0063852 A1* | 3/2017 | Azar | G06V 40/70 |
| 2017/0178431 A1* | 6/2017 | Ashenfelter | G07C 9/257 |

* cited by examiner

*Primary Examiner* — Kevin Bechtel
(74) *Attorney, Agent, or Firm* — FisherBroyles LLP

(57) ABSTRACT

A device captures, at the time of authentication to a secured session, secondary authentication data of the user that has authenticated using primary authentication credentials. Then, during the session, the system is caused to re-authenticate the user using the secondary authentication credentials (such as original and current user's face images). The system actively monitors the face visible to a camera of the computing device. The system compares the current face to the face image captured at the time of authentication. If the system fails to detect the same face captured initially at the time of authentication, then the system automatedly ends or otherwise locks the session to secure that session from an unauthorized user. Accordingly, the system does not rely merely upon initial authentication for an entire session, but rather reauthenticates the user during a single session in order for the session to be permitted to continue.

17 Claims, 9 Drawing Sheets

METHOD AND SYSTEM FOR COMMUNICATION SESSION MANAGEMENT WITH ENHANCED SECURITY

CROSS-REFERENCE TO RELATED APPLICATIONS

This application claims the benefit of priority of U.S. Provisional Patent Applications Nos. and 63/293,311, filed Dec. 23, 2021, and 63/304,041, filed Jan. 28, 2022, the entire disclosure of each of which is hereby incorporated herein by reference.

FIELD OF THE INVENTION

The present invention relates generally to the field of computer networking and computerized data communications sessions, and more particularly to a method and system for communication session management with enhanced security.

DISCUSSION OF RELATED ART

Data communication sessions using computerized devices, such as desktop, laptop, notebook and tablet computers as well as smartphones and similar devices, are commonplace. Often, users are required to provide identification and/or other authorization credentials to "login" to a computerized system or device and access data and/or operability of the system, in an authentication process. Authentication processes may involve the capture of many different types of information, such as usernames/passwords, data read from optical or digital media, biometric information such as iris scans, fingerprints or voice samples and/or automated facial recognition, as well known in the art.

After authentication, access to the system's functionality and data is generally granted freely until the session is ended, typically by action of the user, and in some instances, as the result of a "timeout" process after a predetermined amount of time. Accordingly, this presents a security problem in that persons other than the authenticating user may in certain circumstances access secured data/system functionality after the authorized user has authenticated and rightly been granted access, but before the device, application and/or communication session has been ended, for example, if a properly authorized user forgets, or otherwise fails, to "logout." While this poses a somewhat limited security risk when a user is using the user's own personal computerized device in a private setting, there is a much greater security risk when the computerized device is used in a public setting, where it may be physically accessed by other individuals, or when the computerized device is a shared device, as may be the case, for example, in a library, on a college campus, in a shared office space, or in other communal settings in which a single computerized device is available for use by multiple different users.

What is needed is a method and system for session management that provides enhanced data and/or system security to help limit session access to properly authorized individuals only.

SUMMARY

The present invention provides a method and system for session management with enhanced security that help to limit session access to properly authorized individuals only. A device captures, at the time of authentication to a secured session, secondary authentication data of the user that has authenticated using primary authentication credentials. Then, during the session, the system is caused to re-authenticate the user using the secondary authentication credentials (such as original and current user's face images). The system actively monitors the face visible to a camera of the computing device. The system compares the current face to the face image captured at the time of authentication. If the system fails to detect the same face captured initially at the time of authentication, then the system automatedly ends or otherwise locks the session to secure that session from an unauthorized user. Accordingly, the system does not rely merely upon initial authentication for an entire session, but rather reauthenticates the user during a single session in order for the session to be permitted to continue.

In this manner, unauthorized access to a session as the result of a failure to logout, etc. will be avoided, and enhanced data and/or system security to help limit session access to properly authorized individuals only is provided, which can be particularly useful in the context of use of shared computerized devices.

BRIEF DESCRIPTION OF THE FIGURES

An understanding of the following description will be facilitated by reference to the attached drawings, in which.

DETAILED DESCRIPTION

Figure 1:
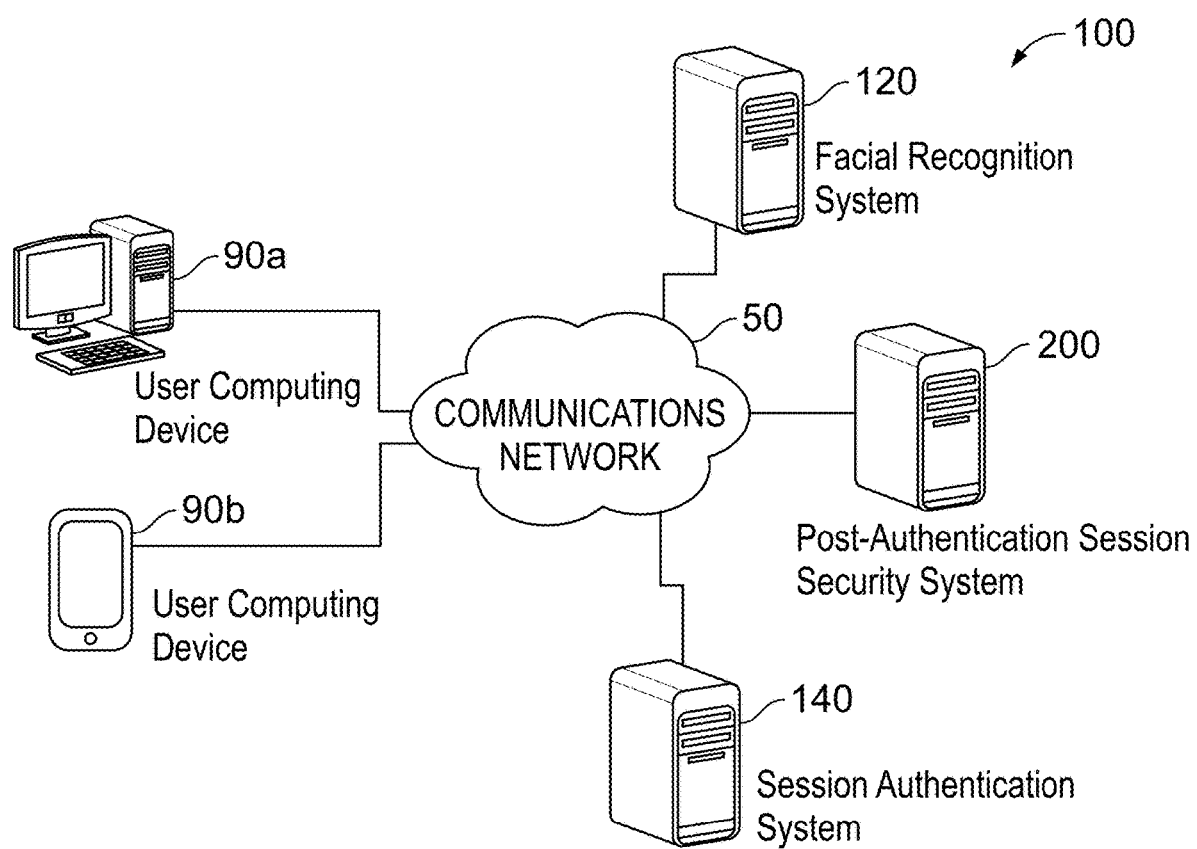
FIG. 1 is a system diagram showing an exemplary network computing environment in which the present invention may be employed.

The present invention provides a method and system that causes a device hosting a secured or confidential device session, application session, or communication session (collectively, "session") to capture, at the time of authentication, the face of the user that has authenticated/logged in via a computing device to participate in the session. Then, during the session, the system is caused to actively monitor the face or faces of the user or users visible to a camera of the computing device. Using facial recognition technology, the system compares, e.g., repeatedly, the current face or faces currently within a field of view of a camera to the face image captured initially at the time of authentication. If at some point the system fails, during the session, to detect (using the facial recognition technology) the face captured initially at the time of authentication, then the system automatedly ends or otherwise locks the device/application/communication session to secure that session from an unauthorized user. Accordingly, the system effectively does not rely merely upon initial authentication for an entire session, but rather reauthenticates the user over time during the session, and requires reauthentication over the course of a single session in order for the session to be permitted to continue. In this manner, unauthorized access to a session as the result of a failure to logout, etc. will be avoided, and enhanced data and/or system security to help limit session access to properly authorized individuals only is provided, which can be particularly useful in the context of use of shared computerized devices.

This functionality may be implemented by a computerized device and/or computing system comprising conventional hardware and software as well as special-purpose software in accordance with the present invention. The functionality of the device/system may be implemented by a local computing device alone, or by a local computing device that is in communication with a remote computing device, e.g., via a communications network such as the internet.

According to illustrative embodiment(s) of the present invention, various views are illustrated in FIGS. 1-9 and like reference numerals are used consistently throughout to refer to like and corresponding parts of the invention for all of the various views and figures of the drawings.

The following detailed description of the invention contains many specifics for the purpose of illustration. Any one of ordinary skill in the art will appreciate that many variations and alterations to the following details are within scope of the invention. Accordingly, the following implementations of the invention are set forth without any loss of generality to, and without imposing limitations upon, the claimed invention.

System Environment

An exemplary embodiment of the present invention is discussed below for illustrative purposes. FIG. 1 is a system diagram showing an exemplary network computing environment 100 in which the present invention may be employed. As shown in FIG. 1, the exemplary network environment 100 includes conventional computing hardware and software for communicating via a communications network 50, such as the Internet, etc., using User Computing Devices 90a, 90b, which may be, for example, one or more personal computers/PCs, laptop computers, tablet computers, smartphones, or other computing device hardware including computerized/networked communication hardware/software/functionality, such as computer-based kiosks, etc. Each User Computing Device 90a, 90b includes or is otherwise associated with a camera capable of capturing an image of a face of a user of the User Computing Device.

In accordance with a certain aspect of the present invention, one or more of the User Computing Devices 90a, 90b may store and execute an "app" or other purpose-specific software in accordance with the present invention, although this is not required in all embodiments.

In accordance with the present invention, the network computing environment 100 further includes a Facial Recognition System 120, which may be any suitable commercially-available system for performing image-based facial recognition tasks, such as to identify faces in images, to recognize faces in images, and/or to match faces of images and/or compare image of faces and determine whether or not they are faces of the same person and/or otherwise match. Such facial recognition functionality is well-known in the art and commercially available in the marketplace, and are beyond the scope of the present invention, and thus are not discussed in greater detail herein. Any suitable facial recognition technology and/or system may be used to perform the facial recognition tasks consistent with the present invention. In certain embodiments, some or all of the functionality of the Facial Recognition System 120 may be provided by a User Computing Device 90a, 90b or other components within the computing environment 100.

In accordance with the present invention, the network computing environment 100 further includes a Session Authentication System 140, which may be any suitable commercially-available system for providing data communications with a User Computing Device 90a, 90b in the nature of a secured or confidential device session, application session, communication session, etc. (without limitation, collectively, "session"). Accordingly, the Session Authentication System 140 may facilitate a session providing access to a user (via a User Computing Device 90a, 90b) to any suitable functionality that is provided via a session that requires initial authentication by a user (e.g., by logging in with a username and password or otherwise to gain access to secured functionality/session, after providing such credentials to permit authentication of the user as an authorized user permitted to have access to the functionality and/or session). Such authentication-based sessions are well-known in the art and hardware and software for securing such sessions and providing such authentication are commercially available in the marketplace, and are beyond the scope of the present invention, and thus are not discussed in greater detail herein. Any suitable Session Authentication System 140 may be used to provide a session consistent with the present invention. In certain embodiments, some or all of the functionality of the Session Authentication System 140 may be provided by a User Computing Device 90a, 90b or other components with a network environment.

In accordance with the present invention, the network computing environment 100 further includes a Post-Authentication Session Security System (PASSS) 200. In this exemplary embodiment, the PASSS 200 is operatively connected to the User Computing Devices 90a, 90b, the Facial Recognition System 120 and/or the Session Authentication System 140 for data communication via the communications network 50. For example, the PASSS 200, the Facial Recognition System 120 and the Session Authentication System 140 may receive user input, image data and/or other data from each User Computing Device 90a, 90b data communication via the communications network 50. Further, each of the PASSS 200, Facial Recognition System 120 and/or Session Authentication System 140 may transmit and/or receive data in data communications to/from any other computerized device via the communications network 50. Hardware and software for enabling communication of data by such devices via such communications networks are well known in the art and beyond the scope of the present invention, and thus are not discussed in detail herein.

It should be noted that in FIG. 1, the Facial Recognition System 120, Session Authentication System 140 and the PASSS 200 are shown as separate and discrete systems for illustrative clarity, but that in other embodiments, the facial recognition functionality, remote session functionality and/or post-authentication session security functionality (and associated hardware and/or software) may be integrated in whole or in part into a User Computing Device 90a, 90b, the Session Authentication System 140 and/or PASSS 200. Further, in certain embodiments, all functionality of the Facial Recognition System 120, Session Authentication System 140 and PASSS 200 may be integrated into the end-user's User Computing Device, without a need to communicate via the communications network 50, such that all authentication, facial recognition and post-authentication session security tasks are performed at the end user's User Computing Device. Accordingly, it should be appreciated that the description with respect to FIG. 1 and/or the exemplary embodiment is for illustrative purposes only, and not limiting.

Post-Authentication Session Security System

Figure 2:
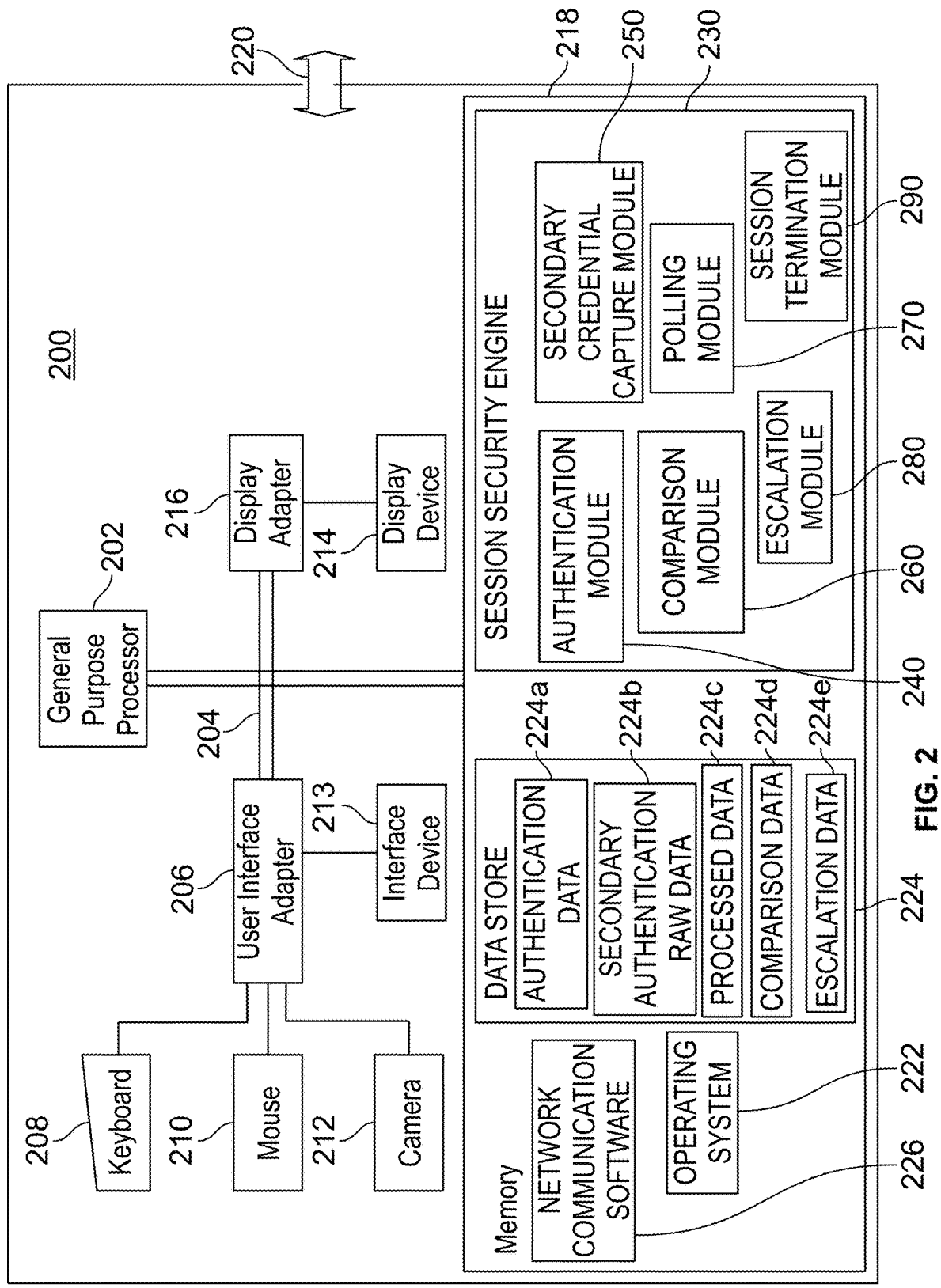
FIG. 2 is a schematic view of an exemplary computing system in accordance with an exemplary embodiment of the present invention.

FIG. 2 is a block diagram showing an exemplary Post-Authentication Session Security System (PASSS) 200 in accordance with an exemplary embodiment of the present invention. The PASSS 200 is a special-purpose computer system that includes conventional computing hardware storing and executing both conventional software enabling operation of a general-purpose computing system, such as operating system software 222, network communications software 226, and specially-configured computer software for configuring the general-purpose hardware as a special-purpose computer system for carrying out at least one method in accordance with the present invention. By way of example, the communications software 226 may include conventional web server software, and the operating system software 222 may include iOS, Android, Windows, Linux software.

Accordingly, the exemplary PASSS 200 of FIG. 2 includes a general-purpose processor, such as a microprocessor (CPU) 202 and a bus 204 employed to connect and enable communication between the processor 202 and the components of the presentation system in accordance with known techniques. The exemplary presentation system 200 includes a user interface adapter 206, which connects the processor 202 via the bus 204 to one or more interface devices, such as a keyboard 208, mouse 210, a camera 212 (particularly a user-facing camera) and/or other interface devices 213, which can be any user interface device, such as a camera, microphone, touch sensitive screen, digitized entry pad, etc. The bus 204 also connects a display device 214, such as an LCD screen or monitor, to the processor 202 via a display adapter 216. The bus 204 also connects the processor 202 to memory 218, which can include a hard drive, diskette drive, tape drive, etc.

The PASSS 200 may communicate with other computers or networks of computers, for example via a communications channel, network card or modem 220. The PASSS 200 may be associated with such other computers in a local area network (LAN) or a wide area network (WAN), and may operate as a server in a client/server arrangement with another computer, etc. Such configurations, as well as the appropriate communications hardware and software, are known in the art.

The PASSS 200 is specially-configured in accordance with the present invention. Accordingly, as shown in FIG. 2, the PASSS 200 includes computer-readable, processor-executable instructions stored in the memory 218 for carrying out the methods described herein. Further, the memory 218 stores certain data, e.g., in one or more databases or other data stores 224 shown logically in FIG. 2 for illustrative purposes, without regard to any particular embodiment in one or more hardware or software components.

Further, as will be noted from FIG. 2, the PASSS 200 includes, in accordance with the present invention, a Session Security Engine (SSE) 230, shown schematically as stored in the memory 218, which includes a number of additional modules (e.g., components) providing functionality in accordance with the present invention, as discussed in greater detail below. These modules may be implemented primarily by specially-configured software including microprocessor—executable instructions stored in the memory 218 of the PASSS 200. Optionally, other software may be stored in the memory 218 and and/or other data may be stored in the data store 224 or memory 218.

As shown in FIG. 2, the exemplary embodiment of the PASSS 200 also includes an Authentication Module (AM) 240. The AM 240 is responsible for authenticating and/or determining whether a user's attempt to authenticate to a session using a User Computing Device 90*a*, 90*b* has been successful. By way of example, in certain embodiments in which the user is authenticating to an external Session Authentication System 140, this may involve transmitting and/or receiving data communications to the Session Authentication System 140 to obtain notification/confirmation of a successful authentication. By way of further example, in certain embodiments in which the user is authenticating to a session on a User Computing Device 90*a*, 90*b*, this may involve a more active role in itself determining whether the authentication is successful, e.g., by receiving user authentication credentials (e.g., username and password) via an input device of the PASSS 200 and/or retrieving authentication data (such as a stored name and/or password) from Authentication Data 224*a* stored in the data store 224 of the PASSS 200 and/or comparing such data to make a determination of whether or not authentication is successful.

In accordance with the present invention, the exemplary embodiment of the PASSS 200 shown in FIG. 2 also includes a Secondary Credential Capture Module (SCCM) 250. The SCCM 250 is responsible for causing a device to captured, actively via action of the user or passively without action of the user, to capture additional (different) authentication credentials. In this example, the SCCM may be an image capture module configured to cause a camera device (e.g., camera 213 of the PASSS 200 and/or any device, such as User Computing Device 90*a*, 90*b*) to capture an image of a current user/operator of the computing device at the time of authentication using the computing device. This may involve transmission of a control signal and/or corresponding data via the network from the PASSS 200 to the User Computing Device 90*a*, 90*b* in certain embodiments (such as that shown in FIG. 1), or may involve more direct control of the computing device's camera without such a communication via the network 50 when the PASSS 200 functionality is integrated into the User Computing Device 90*a*, 90*b*. By way of example, this may be performed under control of the AM 240, e.g., after the AM 240 has confirmed that there has been a successful authentication to a session. The SCCM 250 may be further configured to store captured image data in the data store 224 of the PASSS 200 as Image Data 224*b*.

In accordance with the present invention, the exemplary embodiment of the PASSS 200 shown in FIG. 2 also includes a Comparison Module (CM) 260. In the exemplary embodiment discussed herein, facial images are used as the secondary credential, and correspondingly, the CM 260 may include a facial recognition module capable of performing facial recognition tasks. The CM 260 is responsible for managing and/or performing processing of secondary credentials (e.g., images) and/or other recognition (e.g., facial recognition) tasks (such as identifying faces in an image, preparing one or more face tokens for the one or more faces, comparing tokens and/or faces to determine whether they are image of the same face/person, etc.). By way of example, this may involve transmission of corresponding images and/or other data via the network from the PASSS 200 and/or a User Computing Device 90*a*, 90*b* to the Facial Recognition System 120 (or other credential recognition system) and/or receipt of results of the performance of such tasks by the Facial Recognition System 120 in certain embodiments (such as that shown in FIG. 1) in which facial recognition processing tasks are not performed at the User Computing Device 90*a*, 90*b* and/or the PASSS 200, but rather are performed at a centralized Facial Recognition System 120. By way of further example, this may involve performance of one or more facial recognition tasks at the user Computing Device 90a, 90b without such a communication via the network 50 when the Facial Recognition System 120 functionality is integrated into the User Computing Device 90a, 90b. The CM 260 may be further configured to store captured face and/or facial recognition data in the data store 224 of the PASSS 200 as Comparison Data 224c. By way of example, this may involve creation and/or storing of face image tokens, as known in the art.

In accordance with the present invention, the exemplary embodiment of the PASSS 200 shown in FIG. 2 also includes a Polling Module (PM) 270. The PM 270 is responsible for determining whether and/or when it is an appropriate time to require re-authentication in accordance with the present invention. This may involve the use of any suitable logic. By way of example, the logic may require re-authentication after a predetermined amount of time has passed since an initial authentication, or after a predetermined amount of time has passed since a last re-authentication, and/or after a predetermined amount of time has passed since a last keystroke or other input provided by a user/operator of the User Computing Device 90a, 90b.

Further, the PM 270 is responsible for causing the Secondary Credential Capture Module 250 to capture a subsequent, then-current credential (e.g., image) associated with a then-current user/operator of the User Computing Device 90a, 90b and/or PASSS 200 (or other device used to authenticate as part of the session). This may involve transmission of corresponding data via the network from the PASSS 200 to the User Computing Device 90a, 90b in certain embodiments (such as that shown in FIG. 1), or may again involve direct control of the camera without such a communication via the network 50, e.g., when the PASSS 200 functionality is integrated into the User Computing Device 90a, 90b.

In the exemplary embodiment shown in FIG. 2, the PASSS 200 further includes an Escalation Module (EM) 280. In embodiments in which the PASSS 200 includes an EM 280, the EM 280 is responsible for causing display via the User Computing Device of warning messages/graphics and/or instructions or prompts for reauthentication purposes. This may involve retrieval of associated Escalation Data 224e from the data store 224 of the PASSS 200.

The EM 280 may be further responsible for managing a multi-tiered process by which a user may be provided with one or more attempts to re-authenticate before closing/ending of a session to discontinue session functionality. By way of example, a failure to re-authenticate may result in a prompt to re-attempt re-authentication by allowing for another face image to be captured, perhaps with a different view of the user's face. Further, a first failure to re-authenticate may result in a "locking" of the User Computing Device 90a, 90b and/or a suspension of session functionality before actual closing/termination of a session. Any suitable logic for the process may be used to allow for multiple re-authentication attempts and/or a multi-tiered process to gradually disable session functionality prior to session termination, as desired. This may involve transmission of corresponding data via the network from the PASSS 200 to the User Computing Device 90a, 90b and/or the Session Authentication System 140 in certain embodiments (such as that shown in FIG. 1), or may involve direct control of the session on the User Computing Device without such a communication via the network 50 when the Session Authentication System 120 functionality is integrated into the User Computing Device 90a, 90b.

In accordance with the present invention, the exemplary embodiment of the PASSS 200 shown in FIG. 2 also includes a Session Termination Module (STM) 290. The STM 290 is responsible for termination of the session when it is determined to do so, e.g., by the Escalation Module 280 and/or as a result of a failed reauthentication, which may be determined by the CM 260, or in embodiments such as that shown in FIG. 1, by the Facial Recognition System 120 under the control of the CM 260.

As shown in FIG. 1, an exemplary User Computing Device 90a, 90b, may include a microprocessor and memory as well as a conventional camera. The User Computing Device 90a, 90b may also include a session security engine in accordance with the present invention that is operative to interface with a user to authenticate the user to the system in accordance with the present invention. Additionally or alternatively, the PASSS 2000 may include the session security engine. Additionally, in accordance with the present invention, the User Computing Device 90a, 90b may include a facial recognition engine. Additionally or alternatively, the PASSS 200 and/or the Facial Recognition System 120 may include the facial recognition engine. Various facial recognition engines are commercially-available and any suitable facial recognition technology may be used to implement the present invention.

Exemplary operation of the system of FIGS. 1 and 2 is illustrated in the flow diagrams of FIGS. 3-9. Accordingly, the PASSS 200 of FIGS. 1 and 2 (and/or the User Computing Devices 90a, 90b, in certain embodiments in which PASSS 200 functionality is integrated in the User Computing Devices) may be used to receive input, authenticate the user for access to a secured or confidential device session, communication session, or application session (collectively, "session"), and to re-authenticate the user for such a session.

Figure 3:
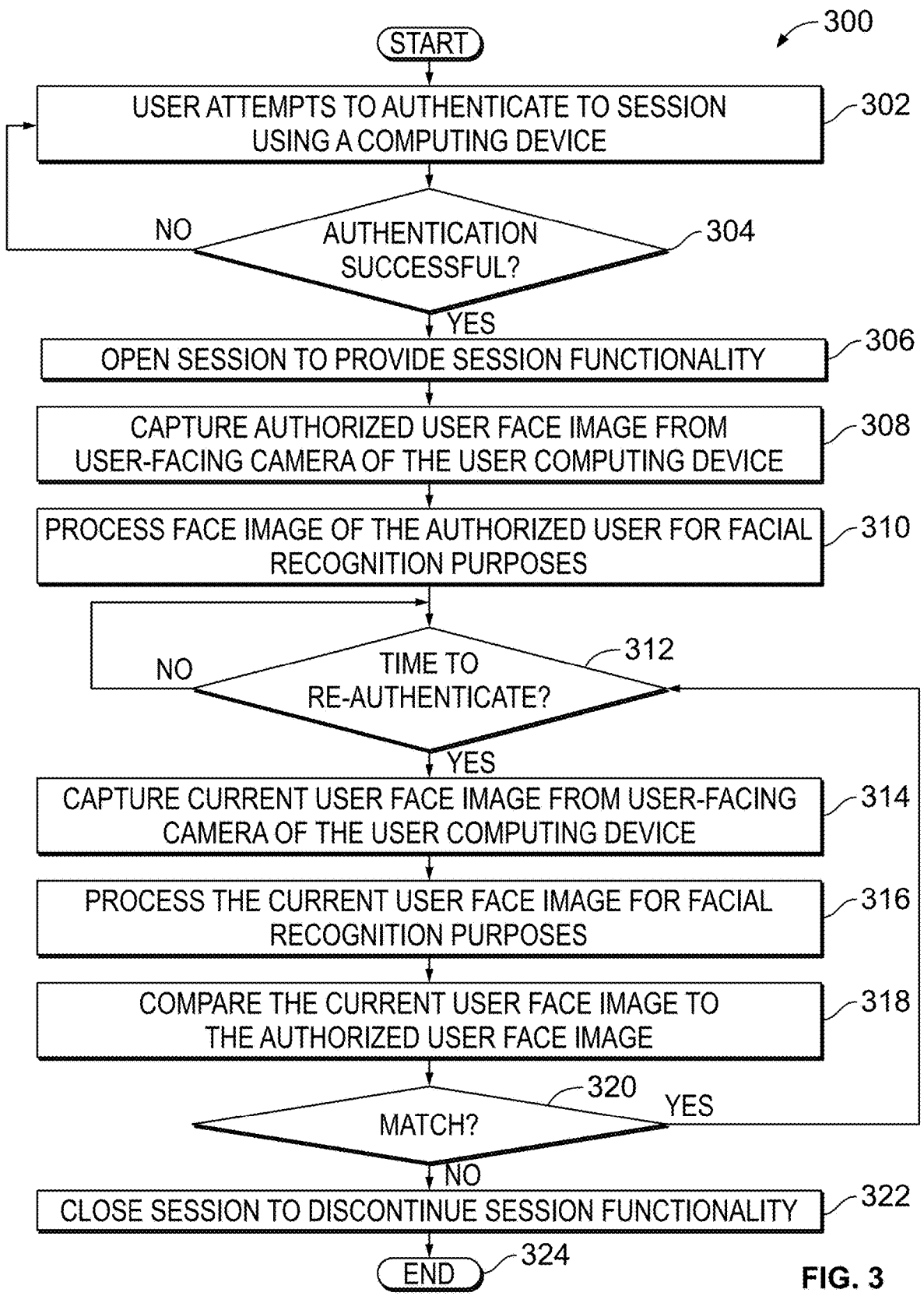
FIG. 3 is a flow diagram illustrating an exemplary method for communication session management with enhanced security.

Referring now to the exemplary method shown in the flow diagram 300 of FIG. 3, the method begins with the user's attempt to authenticate to a session (e.g., to gain access to software application and/or system functionality, etc.) by providing authentication credentials (such as a username and password) as input to/using a User Computing Device 90a, 90b, as shown at 302. This may be performed by, or under control of, the Authentication Module 240 of the SSE 250 of the PASSS 200 (or, in certain embodiments, the User Computing Device 90a, 90b).

The exemplary method next involves determining whether the authentication to the session has been successful, as shown at 304. If not, flow continues to 302, at which point the user may re-attempt to authenticate to a session. In the exemplary embodiment shown in FIG. 1, in which there is a remotely-located Session Authentication System 140, this may involve transmitting data associated with the authentication credentials via the network 50 to the Session Authentication System 140, so that the Session Authentication System may determine whether or not the authentication was successful. In alternative embodiments, the authentication determination may be made locally, at the User Computing Device 90a, 90b (e.g., using Authentication Data 224a stored in the data store 224). The determination may be performed by and/or under control of the AM 240, which may transmit or receive data, or monitor data, to make its determination.

By way of example, the determination may be performed as follows. Upon successful authentication of the user, handled either by a remote identity provider system or a local service on the device, the Authentication Module (240) may receive confirmation of the attempted user authentication request status in a response to that request. This response can be a formatted message that can include a request status (successful, unsuccessful), and if successful, an encoded token may be used for further requests to re-validate the user and can include claims about that authenticated user (such as user first name, user last name, user identification number, user date of birth, etc.). The purpose of this step is to authenticate that the user is who the user claims to be (and the system validating that request needs to be trusted by the requesting party to perform that function and return a reliable response.

If it is determined at 304 that the authentication was successful, then a session is opened to provide session functionality, as shown at 306. This may occur in a generally conventional manner, as known in the art. This may be performed by, or under control of, the Authentication Module 240 of the SSE 250 of the PASSS 200 (or, in certain embodiments, the User Computing Device 90a, 90b, the Session Authentication System 140, etc.). The user may then engage in the session and take advantage of session functionality using the User Computing Device 90a, 90b. In the example shown in FIG. 1, the session may be opened by the Session Authentication System 140, though it should be appreciated that in other embodiments, the session may be opened by the User Computing Device 90a, 90b.

As shown in the exemplary method of FIG. 3, contemporaneously with, e.g., promptly after, confirmation of successful authentication, the PASSS 200 then captures an image containing a face of the authenticating (i.e., authorized) user, using a user-facing camera 213 of the PASSS 200 (in embodiments in which the PASSS 200 is incorporated into the User Computing Device 90a, 90b) and/or the User Computing Device 90a, 90b, as shown at 308. This may be performed by, or under control of, the AM 240 in conjunction with the Secondary Credential Capture Module 250 of the SSE 250 of the PASSS 200 (or, in certain embodiments, the User Computing Device 90a, 90b), to control the camera of the User Computing Device 90a, 90b, etc. to cause capture of an image of the user's face using the camera of the device used to receive authentication credentials for authentication purposes. It will be appreciated that the image should be captured close to the time of successful authentication, so that the face of the authorized user providing the authentication credentials (and not another person) is captured, such that the captured face image is associated with the authorized user having provided authorized authentication credentials. The Secondary Credential Capture Module 250 may cause storage of associated image data in the data store 224 as Image Data 224b.

Next, the exemplary method of FIG. 3 involves processing the captured authorized user face image for facial recognition purposes, as shown at 310. This may be performed by, or under control of, the Facial Recognition Module 260 of the SSE 250 of the PASSS 200 (or, in certain embodiments, the User Computing Device 90a, 90b). In certain embodiments, such as that shown in FIG. 1, this may involve transmitting captured image data to a remotely-located Facial Recognition System 120, via a network 50, although in other embodiments, the facial recognition processing tasks may be performed locally at the User Computing Device 90a, 90b. By way of example, the processing of the captured image may involve identifying one or more face images in a captured image from the camera and tokenizing each face for facial recognition purposes, or otherwise identifying facial characteristics in the image that can be used for facial recognition and/or face matching purposes, as will be appreciated by those skilled in the art. The CM 260 may store face tokens or other facial recognition/characteristic data in the data store 224 as Comparison Data 224c, e.g., in association with a certain session and/or authorized user, so that such Comparison Data 224c can be subsequently referenced for user re-authentication purposes as described herein.

In the exemplary method of FIG. 3, it is next determined whether it is time to re-authenticate, as shown at 312. If not, flow returns to 312 until it is time to re-authenticate. This may be performed by, or under control of, the Polling Module 270 of the SSE 250 of the PASSS 200 (or, in certain embodiments, the User Computing Device 90a, 90b). The determination of whether it is time to re-authenticate may be performed according to any desired logic, e.g., on the basis of elapsed time or otherwise, as described above.

If it is determined, at 312, that it is time to re-authenticate, then the method next involves capturing another image using the user-facing camera of the User Computing Device 90a, 90b, etc., as shown at 314. This may be performed by, or under control of, the PM 270 in conjunction with the AM 240 and/or the Secondary Credential Capture Module 250 of the SSE 250 of the PASSS 200 (or, in certain embodiments, the User Computing Device 90a, 90b), to control the camera of the User Computing Device 90a, 90b to cause capture of an image including the computing device's user's face using the camera. It will be appreciated that this image is captured after the time of successful authentication, so that the face of a then-current user (which may or may not be the authorized user that provided the authentication credentials), so it can be determined whether the current user/operator of the User Computing Device 90a, 90b is the same user (the authorized user) that provided the authentication credentials to open/begin the session. The Secondary Credential Capture Module 250 may cause storage of associated image data in the data store 224 as Image Data 224b.

Next, the exemplary method of FIG. 3 involves processing the captured current user face image for facial recognition purposes, as shown at 316. This may be performed by, or under control of, the Polling Module 270 in conjunction with the Facial Recognition Module 260 of the SSE 250 of the PASSS 200 (or, in certain embodiments, the User Computing Device 90a, 90b). In certain embodiments, such as that shown in FIG. 1, this may involve transmitting captured image data to a remotely located Facial Recognition System 120, via a network 50, although in other embodiments, the facial recognition processing tasks may be performed locally at the User Computing Device 90a, 90b. By way of example, the processing of the face image may involve identifying one or more face images in a captured image from the camera and tokenizing each face for facial recognition purposes, or otherwise identifying facial characteristics in the image that can be used for facial recognition and/or face matching purposes, as will be appreciated by those skilled in the art. The CM 260 may store face tokens or other facial recognition/characteristic data in the data store 224 as Comparison Data 224c, e.g., in association with a certain session and/or authorized user, so that such Comparison Data 224c can be compared to previously captured/stored face image data for user re-authentication purposes.

Next, the exemplary method of FIG. 3 involves comparing the current user face image to the authorized user face image for the session, as shown at 318. This may be performed by, or under control of, the Polling Module 270 in conjunction with the Facial Recognition Module 260 of the SSE 250 of the PASSS 200 (or, in certain embodiments, the User Computing Device 90a, 90b). In certain embodiments, such as that shown in FIG. 1, this may involve transmitting captured image data and/or stored Comparison Data 224c to a remotely located Facial Recognition System 120, via a network 120, although in other embodiments, the facial recognition processing tasks may be performed locally at the User Computing Device 90a, 90b. By way of example, the comparing of the face images may involve identifying one or more face images in a captured image from the camera and retrieved and/or comparing tokens of each face in the current user face image to one or more tokens of faces in the authorized user face image for facial recognition purposes, or otherwise identifying facial characteristics in the image that can be compared for facial recognition and/or face matching purposes, as will be appreciated by those skilled in the art. The CM 260 may store comprising data in the data store 224 as Comparison Data 224d, e.g., in association with a certain session or authorized user, so that such Comparison Data 224d can be used for facial recognition and user re-authentication purposes.

Next, it is determined whether the face image of the current user matches the face image of the authorized user, as shown at 320. By way of example, the determining of a match may involve comparing of the original and subsequent face images, associated face image tokens and/or other facial and/or image characteristics to make this determination, according to any suitable facial recognition technique. This may be performed by, or under control of, the Polling Module 270 in conjunction with the Facial Recognition Module 260 of the SSE 250 of the PASSS 200 (or, in certain embodiments, the User Computing Device 90a, 90b). In certain embodiments, such as that shown in FIG. 1, this may involve transmitting data to and/or receiving data from a remotely located Facial Recognition System 120, via a network 120, although in other embodiments, these facial recognition processing tasks may be performed locally at the User Computing Device 90a, 90b.

Referring again to the exemplary method of FIG. 3, if it is determined at 320 that the subsequently-captured face image of the current user matches the initially-captured face image of the authorized user (that was captured at the time of authentication for the session), then the method flow returns to 312, and it is again determined whether it is time to re-authenticate, and the re-authentication process may be repeated throughout a single session. Notably, in this instance, the session is permitted to continue, and the current operator/user of the user Computing Device 90a, 90b is permitted to continue to have access to the session functionality, because in this case it is considered that the current operator/user is in fact the same authorized user that provided the authorization credentials to successfully authenticate and gain access to the system functionality via the session.

Referring again to the exemplary method of FIG. 3, if it is determined at 320 that the face image of the current user does not match the face image of the authorized user, then the method flow continues to 322 and the session is closed/ended to discontinue session functionality, and the method ends, as shown at 324. This may be performed by, or under control of, the Session Termination Module 290 in conjunction with the Polling Module 270 of the SSE 250 of the PASSS 200 (or, in certain embodiments, the User Computing Device 90a, 90b). In certain embodiments such as that shown in FIG. 1, this may involve the STM 290/PASSS 200 transmitting data via the network 50 to the Session Authentication System 140 to cause termination of the session. Accordingly, in this exemplary embodiment, the session may be ended after one failed re-authentication indicating that the current user is not the authorized user, because the current user face image is determined not to match the authorized user face image.

In certain embodiments, the SSE 250 may include an Escalation Module 280, which may be responsible for managing a multi-tiered process by which a user may be provided with more than one attempt to re-authenticate before closing of a session to discontinue session functionality. The EM 280 may cause display via the User Computing Device 90a, 90b of warning messages/graphics and/or instructions or prompts to reauthenticate, which may involve retrieval of associated Escalation Data 224e from the data store 224 of the PASSS 200. Another exemplary embodiment of a method, involving a multi-tiered escalation process prior to session closure/termination, is discussed below with reference to FIGS. 4-9.

Figure 4:
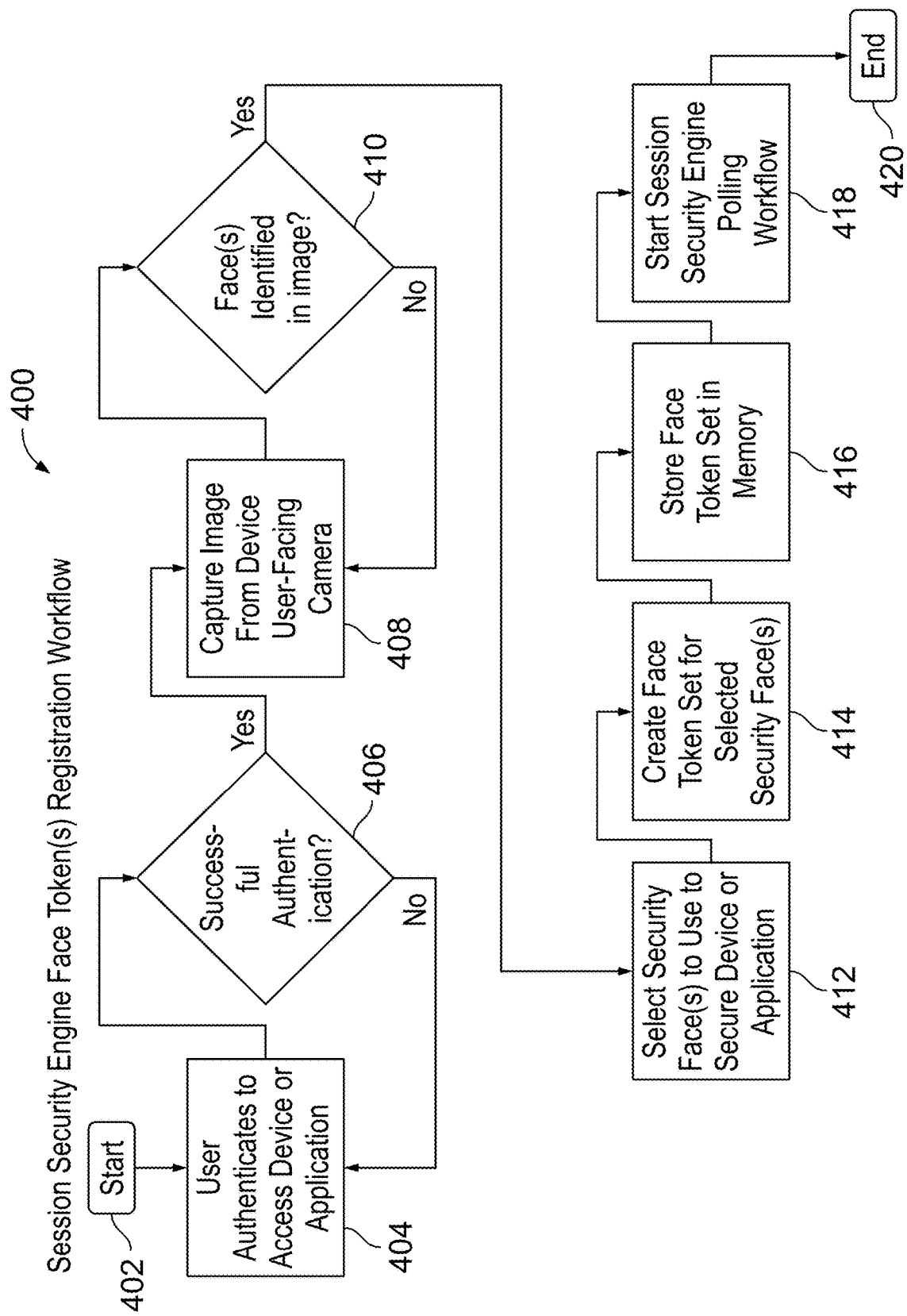
FIGS. 4-9 illustrate further exemplary operation of the system of FIG. 1.

Referring now to FIG. 4, when a user interacts with the computing device to authenticate to a session, which may be performed in any conventional manner, in accordance with the present invention, the Session Security Engine 250 of the User Computing Device 90a, 90b causes the camera of the User Computing Device to capture an image from the device's forward facing camera, to capture an image of the face of the person authenticating at the time of authentication, as shown at 420-408 in FIG. 4. If a face is not identified in the captured image, the system may capture another image, as shown at 410. If a face is identified in the captured image, the system may identify the face and generate a face token, etc. as described above, as shown at 412.

In the event that multiple faces are identified within the captured image, then the system may allow the user to select or confirm a particular face (or faces) image(s) as the face associated with the authorized party performing the authentication, as shown at 412 in FIG. 4.

The authorized face (or faces) image(s) are then processed by the facial recognition engine to obtain a face token set for the selected security face(s), as shown at 414 in FIG. 4. The face token set may then be stored in the memory of the computing device (or remotely), as shown at 416 in FIG. 4 for subsequent authentication/comparison purposes, and the polling workflow (for reauthentication) may be initiated as described above, as shown at 418 of FIG. 4, and the session security engine face token registration workflow of FIG. 4 ends, as shown at 420.

Figure 5:
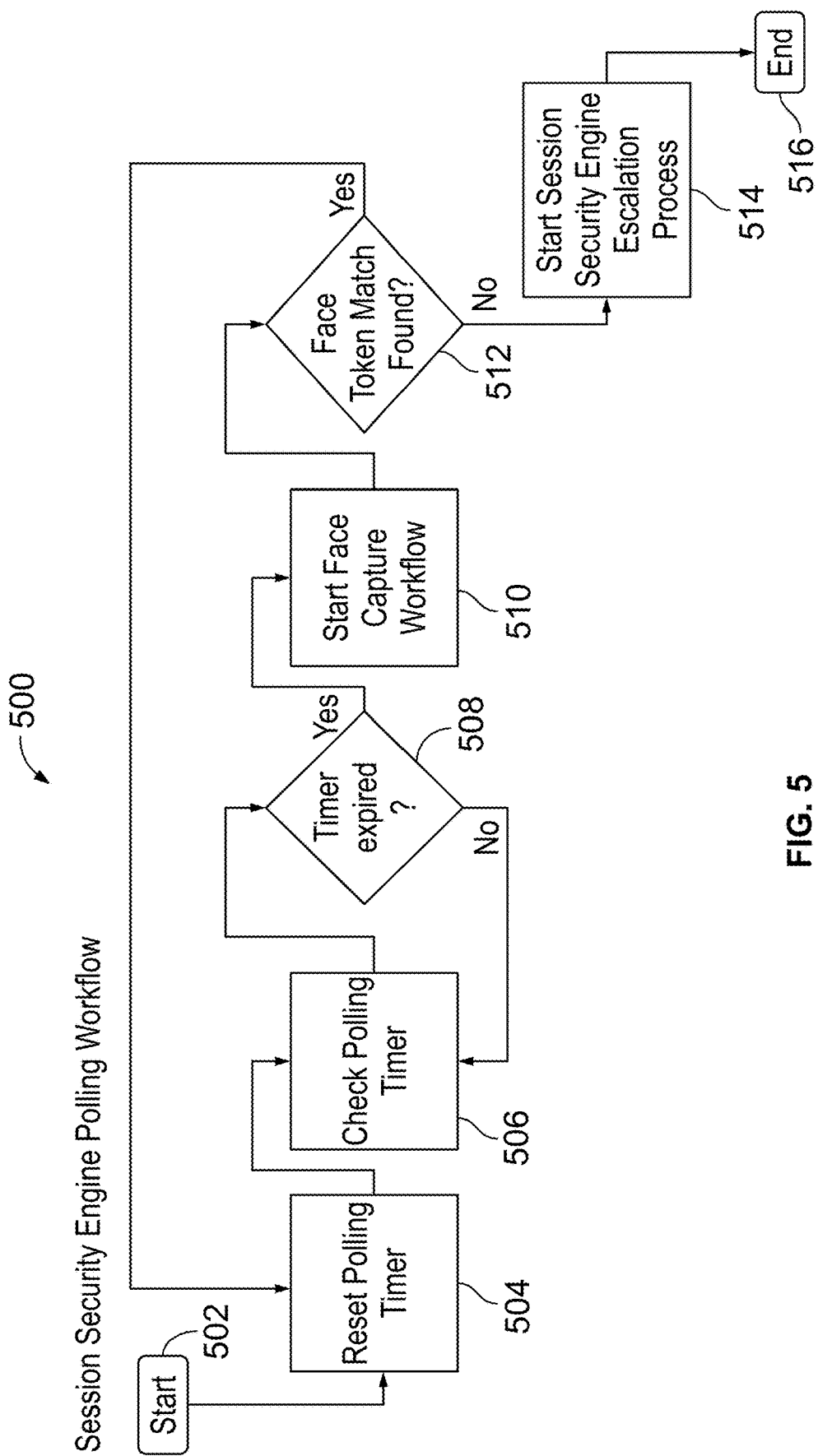

FIG. 5 is a flow diagram illustrating an exemplary session security engine polling workflow 500. This workflow 500 is operative to repeatedly capture new images of the face of the person engaged in operation of the computerized device during the session, and to compare images of the current face (or faces) to the face image captured initially at the time of authentication (by comparison to the face token set). In this manner, the system can determine whether the authorized person (or an authorized person) is continuing to engage in the session, or if an unauthorized person has subsequently engaged in the session. More particularly, in this example, the workflow 500 starts with resetting a polling timer, as shown at 502 and 504. The method then involves checking the polling timer and determining if it has expired, as shown at 506 and 508. If not, the polling timer is continued to be monitored as shown at 506. When it is determined at 508 that the polling timer has expired, then the system starts a face capture workflow as shown at 510 to capture a subsequent face image of a then-current user. The subsequent face image (e.g., token) is then compared to the initially-captured face image (e.g., token) from the time of original session authentication, and it is determined, using facial recognition techniques, whether both images are images of the same person, such that the images match. If so, then the current user is deemed to be the authorized user and the session is permitted to continue, and flow returns to 504 where the timer is reset for subsequent re-authentication.

If, however, the subsequently captured face image/token (captured post-authentication for the same session) does not match the initially-captured stored face image/token for the session, then the system starts a session security engine escalation process, as shown at 514, and the method ends, as shown at 516.

Figure 6:
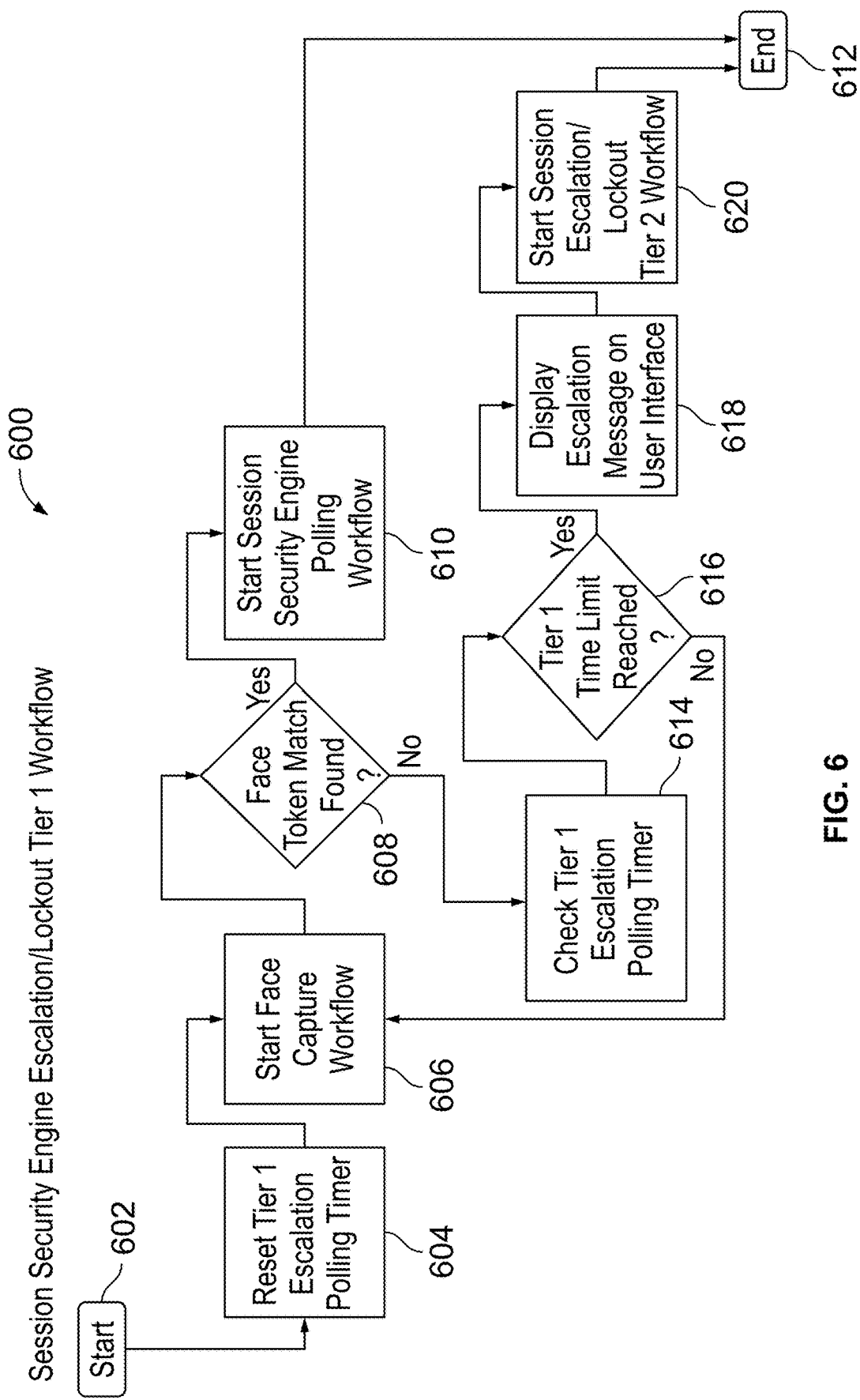

FIG. 6 is a flow diagram illustrating an exemplary session security engine escalation workflow 600. As shown in FIG. 6, this workflow 600 starts with resetting a Tier 1 Escalation Polling Timer, as shown at 602 and 604. It then starts a Face Capture Workflow, as shown at 606, and again captures a face image and attempts re-authentication by attempting to match the subsequently captured face image/token to an earlier captured/stored face image/token, as shown at 608 in FIG. 6.

If the subsequently captured face image/token matches the earlier captured/stored face image/token, then the session securing engine polling workflow is started, as shown at 610, and the method ends, as shown at 612.

If, however, the subsequently captured face image/token does not match the earlier captured/stored face image/token at 608, then the Tier 1 Escalation Polling Timer is checked, as shown at 614. It is next determined if the timer's time limit has been reached, as shown at 616. If not, then the face capture image workflow 606 is re-started to capture another face image.

If, however, the timer's time limit has been reached at 616, then the system causes display of an escalation message indicating a failed authentication on a display device of the User Computing Device, as shown at 618, and a Tier 2 escalation workflow is started and this workflow ends, as shown at 620 and 612 in FIG. 6.

Figure 7:
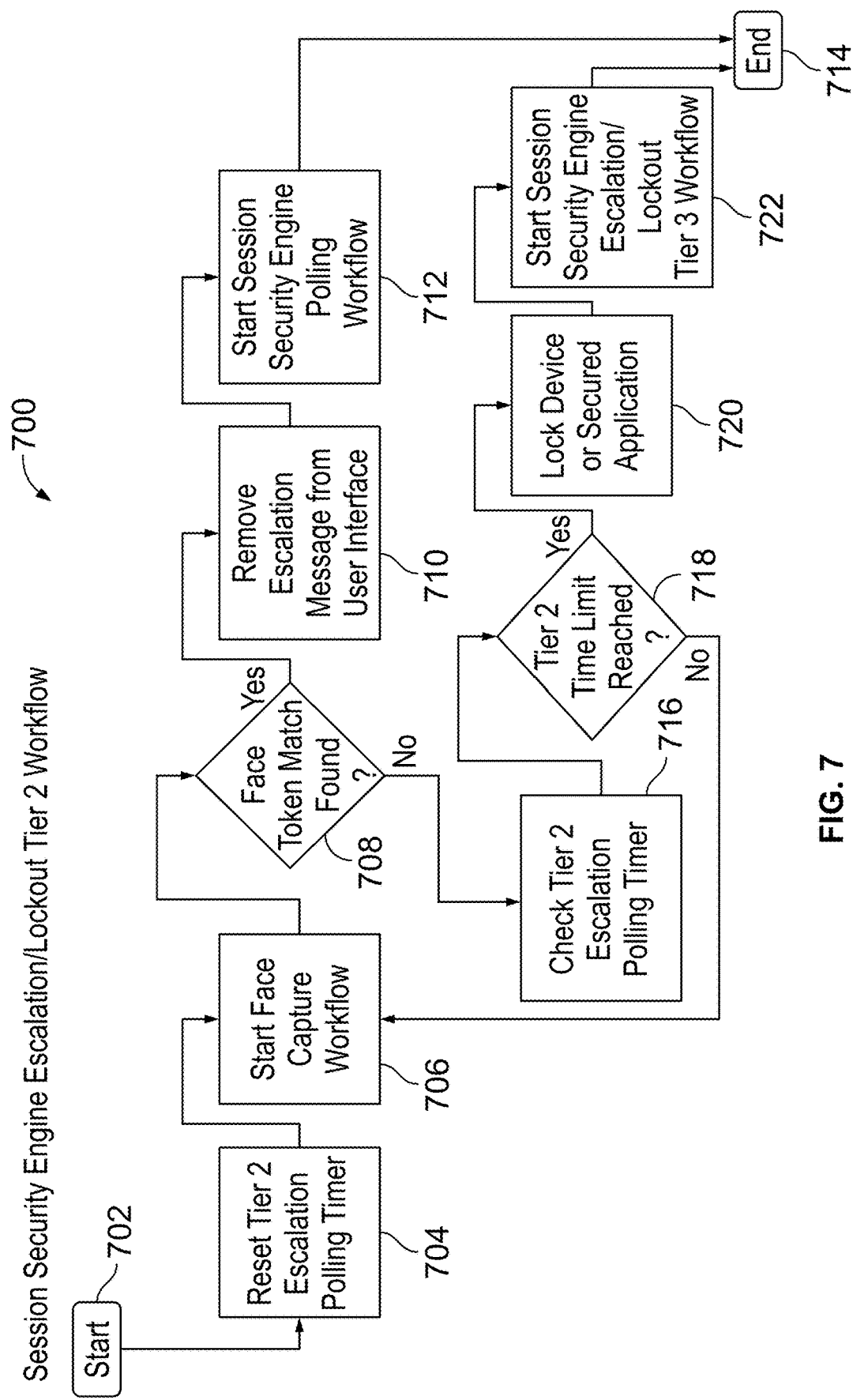

FIG. 7 is a flow diagram illustrating an exemplary session security engine escalation Tier 2 workflow 700. As shown in FIG. 7, this workflow 700 starts with resetting a Tier 2 escalation polling timer, as shown at 702 and 704 of FIG. 7. Next, the workflow involves again capturing a subsequent face image and attempting re-authentication by attempting to match the captured face image/token to a stored face image/token, as shown at 706 and 708 in FIG. 7. If a match is found, then the workflow removes the displayed escalation message from the user interface of the User's Computing Device, as shown at 710, and the session security engine polling workflow is restarted at 712, and this workflow ends, as shown at 714.

If, however, a match is not found at 708, then the Tier 2 escalation polling timer is checked as shown at 716, and it is determined if the Tier 2 time limit has been reached, as shown at 718. If the Tier 2 time limit has not been reached, then flow returns to 706 and a subsequent face image is again captured.

If, however, the Tier 2 time limit has been reached, then the User Computing Device 90*a*, 90*b* and/or Session is locked, as shown at 720, to prevent the then-current user from continuing to access system functionality (at least temporarily) via the session. The workflow next involves starting a Tier 3 escalation workflow as shown at 722, and this workflow ends, as shown at 714.

Figure 8:
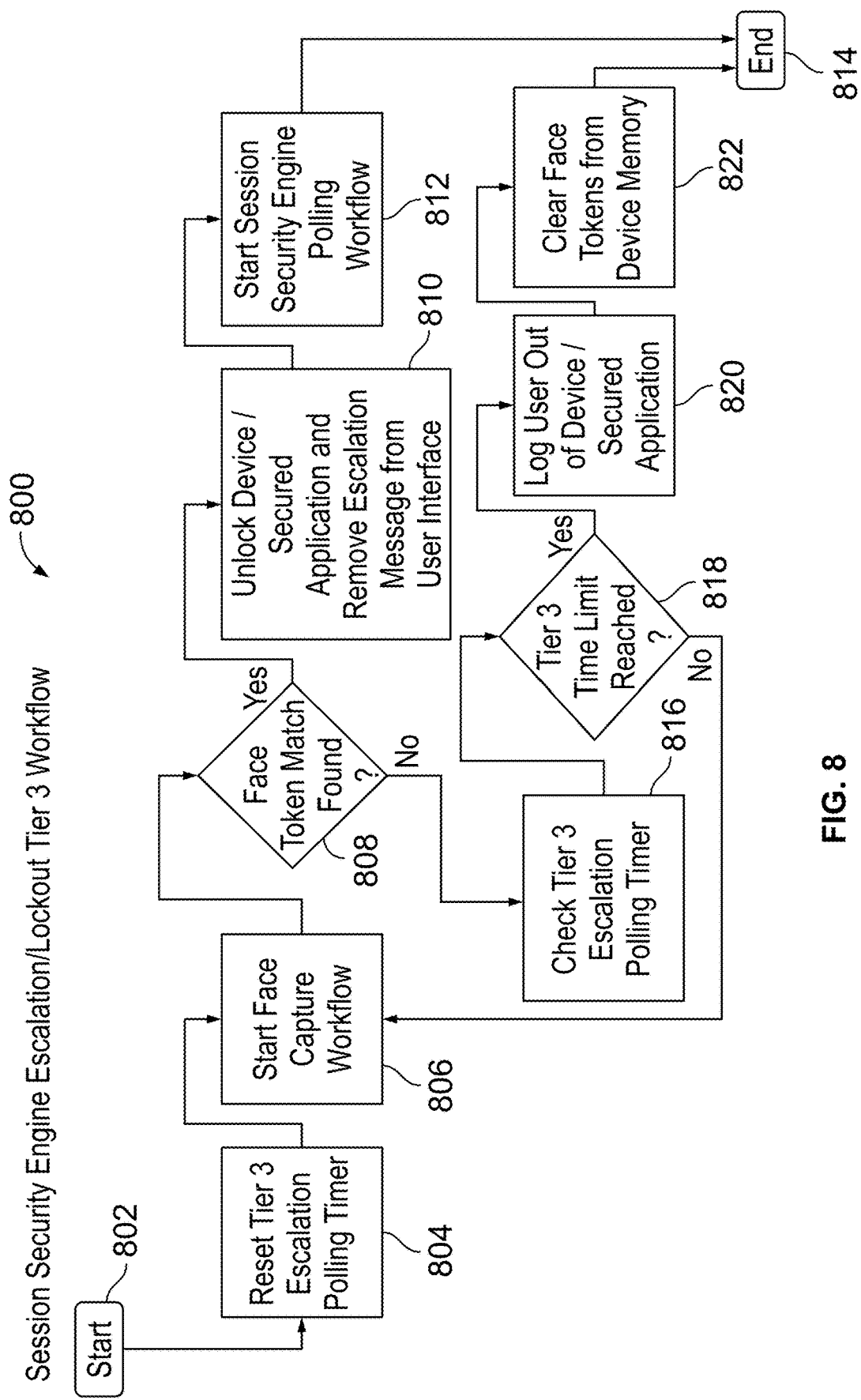

FIG. 8 is a flow diagram illustrating an exemplary Tier 3 session security engine escalation workflow 800. As shown in FIG. 8, this workflow 800 starts with resetting a Tier 3 escalation polling timer, as shown at 802 and 804 of FIG. 8. Next, the workflow involves again capturing a subsequent face image and attempting re-authentication by attempting to match the captured face image/token to a stored face image/token, as shown at 806 and 808 in FIG. 8. If a match is found, then the workflow unlocks the User Computing Device 90*a*, 90*b* and/or session to restore the user's access to the system functionality via the session, as shown at 810, and the session security engine polling workflow is restarted at 812, and this workflow ends, as shown at 814.

If, however, a match is not found at 808, then the Tier 3 escalation polling timer is checked as shown at 816, and it is determined if the Tier 3 time limit has been reached, as shown at 818. If the Tier 3 time limit has not been reached, then flow returns to 806 and a subsequent face image is again captured.

If, however, the Tier 3 time limit has been reached, then the user is logged out of the User Computing Device 90*a*, 90*b* and/or session to end/close the session, as shown at 820. In this example, the initial and subsequent face images/tokens associated with that session may then be cleared from memory, as shown at 822, and this workflow ends, as shown at 814.

Figure 9:
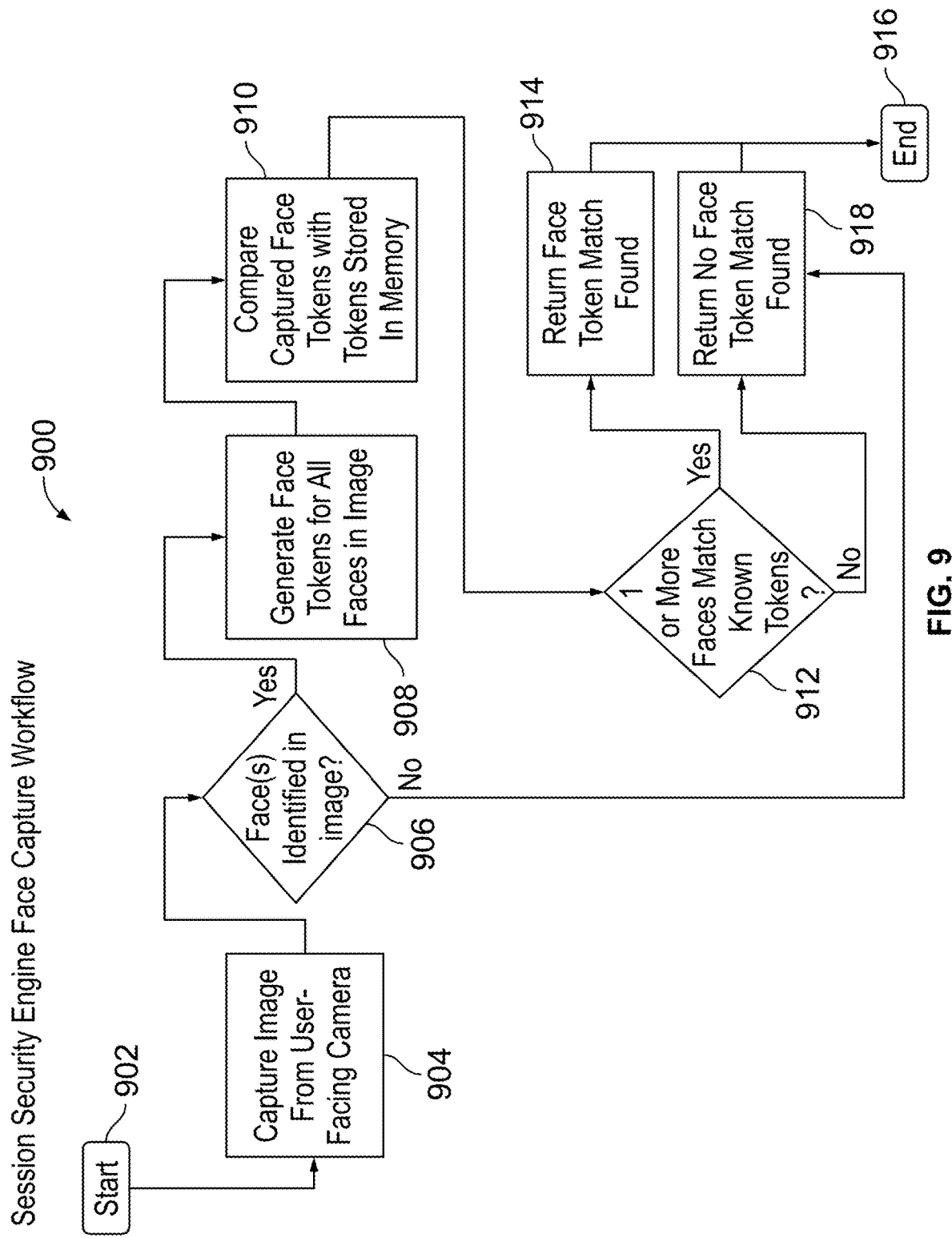

FIG. 9 is a flow diagram illustrating an exemplary session security engine face capture workflow 900 that is used as part of the security session engine workflows of FIGS. 5-8. As shown in FIG. 9, this workflow 900 starts with capture of an image from the user-facing camera, as shown at 902 and 904. It is then determined (e.g., using facial recognition techniques) whether one or more faces are identified in the image, as shown at 906. If not, then it is confirmed that no match has been found and this workflow ends, as shown at 918 and 916.

If however, one or more faces are identified in the captured image, then the system generates a face token for each face identified in the image, as shown at 908. The system then compares these face tokens with earlier-stored face tokens from earlier captured faces, as shown at 910. It is then determined if one or more later-captured face images/tokens match the earlier-captured face image(s)/token(s), as shown at 912. If so, then it is confirmed that a match has been found and this workflow ends, as shown at 914 and 916. If, however, it is determined that there are no matches, then it is confirmed that a match has not been found, as shown at 918, and the face capture workflow ends, as shown at 916 in FIG. 9.

If, however, one or more faces are found in the image (by the facial recognition engine), then a respective face token is generated for each face in the image, and each face token is compared with the stored face token(s), as shown in FIG. 9. If one or more faces match the stored tokens, then it is determined that a face token match was found, and the face capture workflow ends. If, however, it is determined that none of the faces match any of the stored tokens, then it is determined that no face token match was found, and the face capture workflow ends, as shown in FIG. 9.

Accordingly, if the system fails, during the session, to detect (using facial recognition technology) the face captured initially at the time of authentication, then the system automatedly ends or otherwise locks the application or open communication to secure that session from an unauthorized user.

Accordingly, with respect to the escalation process, if the escalation process begins, the user will have a 2-tiered grace period to continue the session. The first tier will allow the user to be out of the field of view for a fixed amount of time with a warning displayed on the user interface. The second tier will activate after that fixed amount of time and will lock the screen from being used but continue the session hidden from view. Once the second-tier times out, the session will discontinue, logging out the user, clearing the facial recognition token set on the device, and removing data associated with that user session.

Other session management techniques require active user participation to manage or stored biometric data to compare against. If the user forgets to or is unable to actively manage their secured or confidential session, the data or session is at risk of being exploited intentionally or unintentionally by another user. In the case that a session is managed by stored, biometric data, the key can become stale as the user changes (look, hair, glasses, mask, etc.). In certain embodiments, the present invention captures a new reference image for authentication purposes at the time of authentication, and thus inconsistences from a change in the day-to-day or other appearance of a single person are eliminated.

In the exemplary embodiments discussed above, facial recognition is contemplated as the source/manner of reauthentication. However, it should be appreciated that in other embodiments, other sources/manners of reauthentication may be employed. For example, post-authentication user session management in accordance with the present invention may be alternatively accomplished other biometric information, e.g., during a voice interaction via a voice print (identified voice token) (e.g., using a voice sample capture with a microphone instead of a facial image capture with a camera). By way of further example, other biometric identifiers may be used as alternatives to a voice print during a spoken session, such as a fingerprint on a keyboard, mouse, or device chassis, or a retina scan, etc. Any suitable authentication manner may be used, biometric or otherwise, provided that it allows for initial capture at the time of authentication, and subsequent re-validation after initial authentication, in a manner similar to that described in the facial recognition-based example above, for illustrative purposes only.

While there have been described herein the principles of the invention, it is to be understood by those skilled in the art that this description is made only by way of example and not as a limitation to the scope of the invention. Accordingly, it is intended by the appended claims, to cover all modifications of the invention which fall within the true spirit and scope of the invention.

What is claimed is:

1. A post-authentication user session management system comprising:
   a memory operatively comprising a non-transitory data processor-readable medium;
   a data processor operatively connected to the memory;
   a user input device;
   a session security engine comprising instructions stored in the memory and executable by the processor to:
      receive user input of a primary authentication credential and provide access to a session only if the primary authentication credential is determined to be a valid credential for accessing the session;
      capture, concurrently with determining the primary authentication credential to be a valid credential for accessing the session, a first face image for use as an initial secondary authentication credential;
      determine an appropriate time for requiring reauthentication during the session, and re-capture the secondary authentication credential as a second face image during the session at the appropriate time; and
      compare the second face image secondary authentication credential to the first face image secondary authentication credential, permitting the session to continue if the second face image secondary authentication credential matches the first face image secondary authentication credential, and initiating termination of the session if the second face image secondary authentication credential does not match the first face image secondary authentication credential.

2. The post-authentication user session management system of claim 1, wherein the session security engine is configured to cause a camera of a user's computing device to capture the first and second face images of the user for use as the secondary authentication credentials.

3. The post-authentication user session management system of claim 2, wherein the comparison module comprises a facial recognition engine configured to compare faces in images.

4. The post-authentication user session management system of claim 1, wherein the session security engine's instructions stored in the memory are further executable by the processor to capture the initial secondary authentication credential by causing a user-facing camera to capture the first and second face images of the authenticating user and generating an initial authentication face token that is stored in association with the session and deleted upon session termination; and wherein the comparing comprises comparing a recaptured face token generated from a re-captured face image during the session to the initial authentication face token.

5. The post-authentication user session management system of claim 1, wherein the session security engine's instructions stored in the memory are further executable by the processor to capture the initial secondary authentication credential by causing a user-facing camera to capture the first and second face images of the authenticating user and generating an initial authentication face token that is stored in association with the session; and wherein the comparing comprises comparing a recaptured face token generated from a re-captured face image during the session to the initial authentication face token.

6. The post-authentication user session management system of claim 1, wherein the session security engine is further configured to, upon a non-match between the re-captured face token and the initial session-specific face token, perform an escalation sequence comprising: (i) generating a warning notification, (ii) locking the session if the user fails to respond to the warning, and (iii) terminating the session if the user fails to respond to the lock.

7. The post-authentication user session management system of claim 1, wherein the session security engine determines the appropriate time to re-capture the secondary credential based on elapsed time since a last detected user input.

8. The post-authentication user session management system of claim 1, wherein the session security engine determines the appropriate time to re-capture the secondary credential based on elapsed time since a last network transaction.

9. The post-authentication user session management system of claim 1, wherein the session security engine determines the appropriate time to re-capture the secondary credential based on a predefined re-authentication interval independent of user input or network activity.

10. The post-authentication user session management system of claim 1, wherein deleting the stored face token upon termination further comprises purging the token from both volatile memory and non-volatile storage.

11. The post-authentication user session management system of claim 1, wherein the session security engine is further configured to suspend termination upon a non-match when the user provides an additional valid primary credential within a timeout period.

12. A post-authentication user session management system comprising:
   a memory comprising a non-transitory processor-readable medium;
   a data processor operatively connected to the memory; and
   a session security engine configured to:
      receive user input of a primary authentication credential;
      provide access to a session only if the primary authentication credential is determined to be a valid credential for accessing the session;
      capture a first face image for use as an initial secondary authentication credential concurrently with a determination of the primary authentication credential as a valid credential for accessing the session;
      determine an appropriate time for requiring reauthentication during the session, and re-capture secondary authentication credential as a second face image during the session at the appropriate time;
      compare the second face image secondary authentication credential to the first face image secondary authentication credential; and
      permit the session to continue if the second face image secondary authentication credential matches the first face image secondary authentication credential, and initiate termination of the session if the second face image secondary authentication credential does not match the first face image secondary authentication credential.

13. The post-authentication user session management system of claim 12, wherein capturing each secondary credential comprises causing a camera to capture the first and second face images of a user, for use as the secondary authentication credential.

14. The post-authentication user session management system of claim 12, wherein the session security engine is further configured to store the initial secondary authentication credential in association with the session, and upon termination of the session delete the stored secondary authentication credential associated with the session.

15. The post-authentication user session management system of claim 12, wherein the session security engine is further configured to cause a user-facing camera to capture the first and second face images of the authenticating user and generate, concurrently with determining that the primary authentication credential is valid, a face token as an initial, session-specific secondary authentication credential, and store the face token in association with the session.

16. The post-authentication user session management system of claim 12, wherein the session security engine is further configured to cause a user-facing camera to capture the first and second face images of the authenticating user and generate, concurrently with determining that the primary authentication credential is valid, a face token as an initial, session-specific secondary authentication credential, store the face token in association with the session, and compare the face token generated from the re-captured face image to the face token generated at validation.

17. The post-authentication user session management system of claim 12, wherein the session security engine is further configured to and delete the stored face token upon termination of the session.

* * * * *